Patented Dec. 27, 1932

1,892,599

UNITED STATES PATENT OFFICE

EDWARD ATHERTON, OF WARWICK, ENGLAND

MANUFACTURE OF GELATINE

No Drawing. Application filed August 16, 1930, Serial No. 475,843, and in Great Britain May 26, 1930.

This invention relates to improvements in the manufacture of gelatine and has for its object to effect a sterilization of the gelatine. A further object is to increase the solubility and also the jelly strength and to produce a puffed gelatine in sheet, flake or other form.

According to this invention there is provided a process of treating gelatine which consists in subjecting gelatine suddenly to a high temperature, preferably about 900 degrees F., for a period of approximately three and one-half seconds whereby moisture contained in the gelatine is suddenly vaporized so as to puff the gelatine. The heating of the gelatine may be effected by passing it through a muffle furnace or other suitably heated chamber whereby the whole of the surface of the gelatine is exposed to the same temperature.

The period during which the gelatine is heated and the temperature to which it is subjected are such as to avoid charring or carbonizing the gelatine or merely drying the gelatine without puffing it.

Any grade of gelatine from the best quality down to common glue may be subjected to the present treatment.

The gelatine for treatment according to the present invention must contain sufficient moisture to effect the puffing of the gelatine when such moisture is vaporized. Gelatine which has been completely dried, that is, gelatine from which all the moisture has been removed, must be allowed to re-absorb moisture, which it will do if allowed to stand in a humid atmosphere, before being suitable for the present treatment.

After the heat treatment, the gelatine may, if desired, be passed through a refrigerating or cooling chamber, but this is not essential.

The treated gelatine may be packed in crisp, dry form into hermetically sealed containers, or the treated gelatine may be allowed to absorb moisture from a sterilized atmosphere, such as an atmosphere containing sulphur dioxide. However, gelatine which has absorbed moisture from a sterilized atmosphere will have a jelly strength less than that of the crisp, dry form of gelatine.

A convenient method of heating the gelatine in sheet, flake, tablet or other form consists in passing it in shallow trays through a muffle furnace in which the hot gases are upwardly and downwardly directed, or other suitably heated chamber which is adapted to subject the whole surface of the gelatine to the same temperature.

The wire trays, which are preferably of aluminium wire, are attached to a conveyor, the speed of which is regulated according to the temperature of the furnace so as to prevent charring of the gelatine.

It will be generally found that the temperature of the furnace should be between 350 degrees F., and 1000 degrees F. The temperature should be as high as possible, as the higher the temperature the better the results. However, as the temperature increases, the speed of the conveyor must be increased or charring and carbonizing will result.

Generally the best working conditions are obtained with a temperature of 900 degrees F., and a speed of feed of 20 feet per minute (approximately) with a gelatine of from 3/1000th inch to 6/1000th inch in thickness. The thinner the gelatine the better the results and the whiter the product. The length of the furnace for this temperature and speed would be approximately 14 inches.

The wire trays are preferably pivotally attached at one end to the conveyor so that after passing through the heating chamber or muffle, the trays move about their pivots to deposit the treated gelatine into a suitable receptacle or on to crushing or flaking rolls or grinding mill. Gelatine in powder or granular form may be conveniently subjected to heat by passing it in suspension through a heated chamber, or gelatine in such form may be heated by passing it through a heated chamber or muffle furnace in shallow trays attached to a conveyor as described above.

The heating of the gelatine not only sterilizes it, but the atmospheric or other moisture contained in the sheet, flake or other form of gelatine is vaporized and imparts a puffed appearance to the gelatine.

Gelatine prepared according to this invention may be advantageously employed for edible, photographic and industrial purposes, and essences, extracts, flavours or other ingredients may be added to the gelatine either before or after the heat treatment according to whether the ingredient will stand the temperature.

I claim:—

1. A process of sterilizing and puffing gelatine containing normal atmospheric moisture which consists in subjecting said gelatine to a temperature of approximately 900° F. for an approximate period of three and one-half seconds.

2. A process of sterilizing and puffing gelatine containing normal atmospheric moisture which consists in subjecting said gelatine to a temperature of approximately 900° F. for an approximate period of three and one-half seconds, and subsequently grinding the puffed gelatine into flakes or powder.

3. A process of sterilizing and puffing gelatine containing natural atmospheric moisture which consists in suddenly subjecting the gelatine to a temperature of between 350° F. and 1000° F.

In testimony whereof I have affixed my signature hereto this 7th day of August 1930.

EDWARD ATHERTON.